No. 795,813. PATENTED AUG. 1, 1905.
J. J. BUCKLEY, T. P. McGINN & J. A. ROGAN.
SPINNING MECHANISM.
APPLICATION FILED JAN. 26, 1905.

4 SHEETS—SHEET 1.

WITNESSES.

INVENTORS

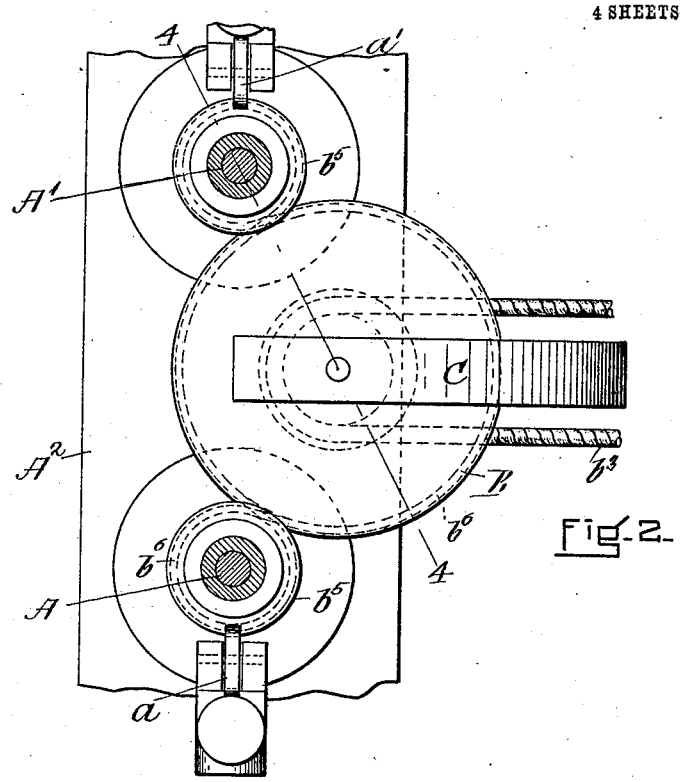
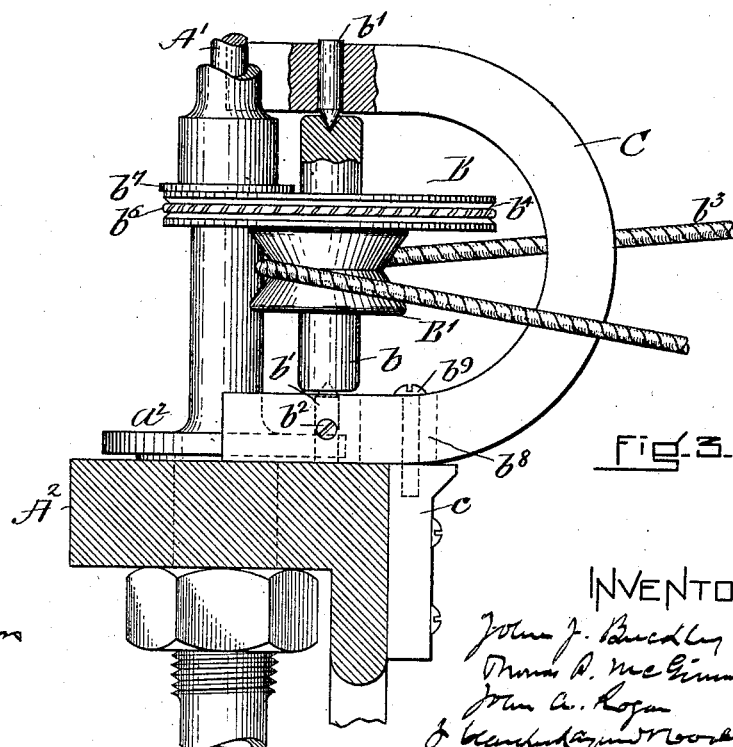

No. 795,813. PATENTED AUG. 1, 1905.
J. J. BUCKLEY, T. P. McGINN & J. A. ROGAN.
SPINNING MECHANISM.
APPLICATION FILED JAN. 26, 1905.

4 SHEETS—SHEET 3.

WITNESSES.
INVENTORS.

No. 795,813. PATENTED AUG. 1, 1905.
J. J. BUCKLEY, T. P. McGINN & J. A. ROGAN.
SPINNING MECHANISM.
APPLICATION FILED JAN. 26, 1905.
4 SHEETS—SHEET 4.
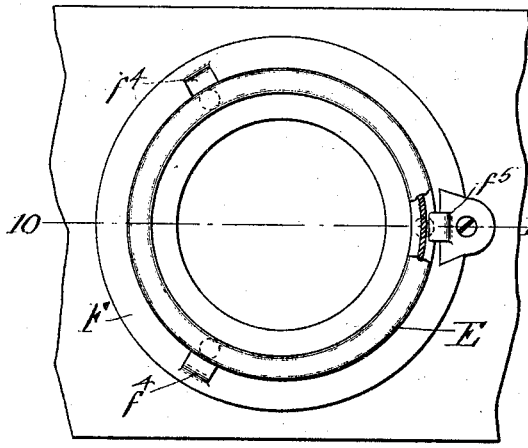
Fig. 9.
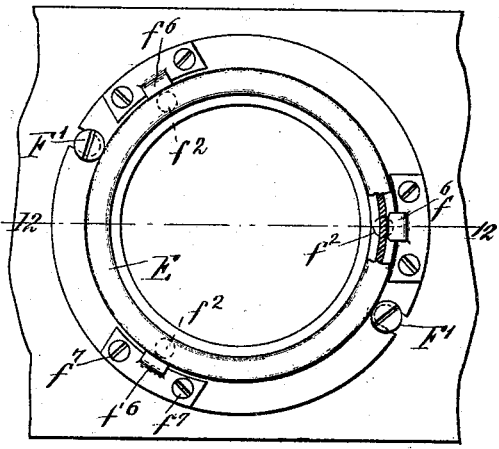
Fig. 11.
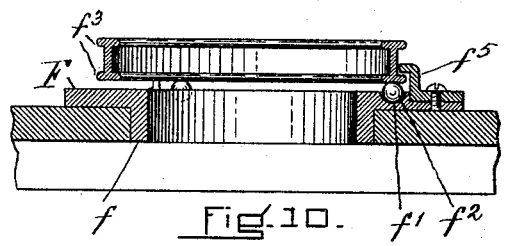
Fig. 10.
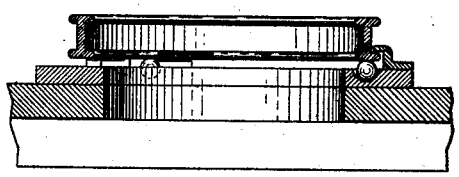
Fig. 12.
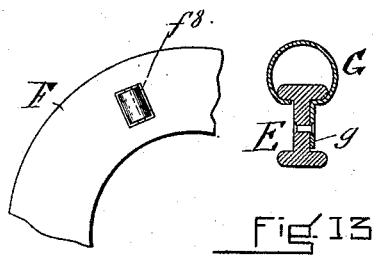
Fig. 13.
Fig. 15.
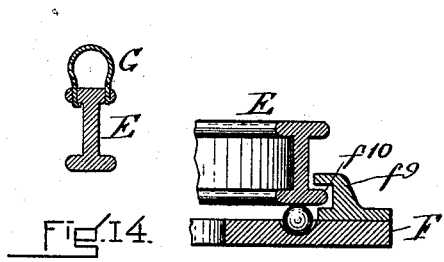
Fig. 14.
Fig. 16.
WITNESSES.
J. M. Dolan
M. V. Foley.
INVENTORS
John J. Buckley
Thomas P. McGinn
John A. Rogan

UNITED STATES PATENT OFFICE.

JOHN J. BUCKLEY, THOMAS P. McGINN, AND JOHN A. ROGAN, OF PLYMOUTH, MASSACHUSETTS.

SPINNING MECHANISM.

No. 795,813.      Specification of Letters Patent.      Patented Aug. 1, 1905.

Application filed January 26, 1905. Serial No. 242,717.

*To all whom it may concern:*

Be it known that we, JOHN J. BUCKLEY, THOMAS P. MCGINN, and JOHN A. ROGAN, citizens of the United States, and residents of Plymouth, in the county of Plymouth and State of Massachusetts, have invented a new and useful Improvement in Spinning Mechanism, of which the following is a specification.

Our invention relates especially to means for mounting the traveler-eye by which an amount of work can be gotten from each spindle greater than from any machine now known to us at a less expenditure of power.

Our invention will be understood by reference to the drawings, in which—

Figure 1:
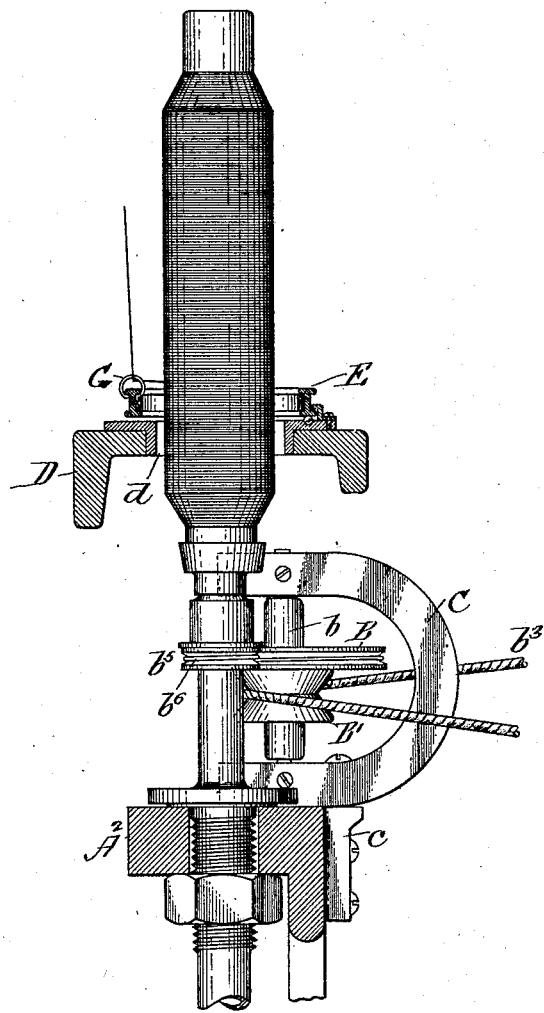
Figure 4:
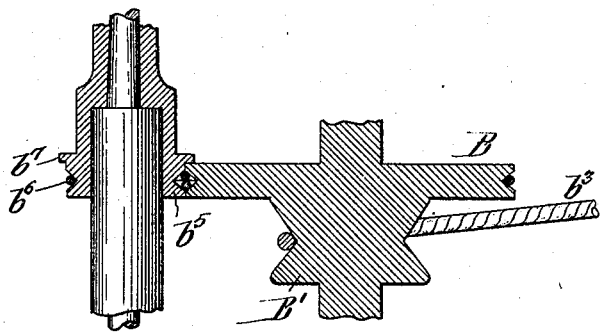
Figure 5:
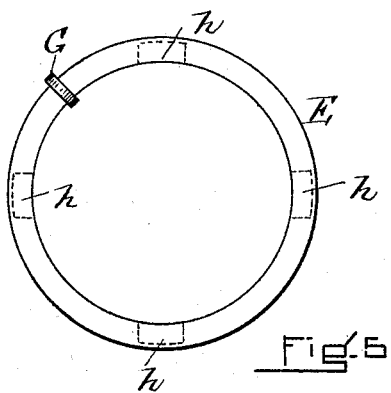
Figure 6:
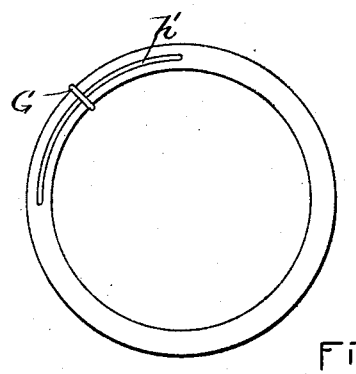
Figure 7:
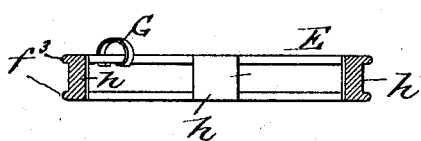
Figure 8:

Figure 1 is a vertical section of a portion of a spinning-frame, showing a spindle and a section of the ring and of its supporting-rail and indicating also the means for rotating the spindle in elevation. Fig. 2 is a plan of the mechanism shown in Fig. 1, the ring-rail being omitted and the spindles being shown in section. Fig. 3 is an enlarged detail of the spindle-rotating mechanism. Fig. 4 is a section on line 4 4 of Fig. 2. Figs. 5 and 6 show modified forms of rings in plan. Figs. 7 and 8 show the same rings in vertical section. Fig. 9 is a plan showing the ring in position. Fig. 10 is a vertical section on line 10 10 of Fig. 9. Fig. 11 is a plan showing another means of holding the ring in place. Fig. 12 is a section on line 12 12 of Fig. 11. Figs. 13 and 14 show different ways of attaching the eye to the ring. Fig. 15 shows another form of bearing for the ring, and Fig. 16 shows another way of holding the ring in place.

A A' are the spindles. These spindles with the exception of the whirl may be of any ordinary construction and provided with bobbins and latched into their bolsters by latches $a$ $a'$ in the usual manner.

$A^2$ is the spindle-rail, on which is mounted the bolster $a^2$, into which the spindle proper is set.

The rotation of the spindle whereby greater speed is had than heretofore is accomplished by means of a power-disk B, mounted in a yoke-piece C, supported by means of a bracket $c$ on the spindle-rail $A^2$. We prefer that the axle $b$ of the power-disk B should be concaved at each end to receive centering-pins $b'$, which pass through portions of the yoke C and form a bearing for the axle $b$ and which being pointed allow it to run with but little friction. Each pin $b'$ is held in place by a set-screw $b^2$, so that the location of the pins may be adjusted for wear. The axle $b$ also carries a whirl or pulley B', and to this runs the cord or belt $b^3$ from the drum, (not shown,) from which power is ordinarily applied to run spindles in machines of this character. The power-disk B is provided with a groove $b^4$ in its periphery, and each spindle is provided with a whirl $b^5$, and the spindles, whirls, and power-disk B are so located with relation to each other that a belt $b^6$ may be passed around the disk and around the spindle-whirls in such manner that the rotation of the power-disk B will cause both spindles to rotate in the same direction, if desired. In addition, however, we provide each spindle-whirl $b^5$ with an upper flange $b^7$, slightly larger in diameter than its lower flange and so located with relation to the other parts that in its normal position it will rest upon the upper surface of the power-disk B. Hence in the construction shown the rotation of the power-disk B will cause the rotation of both spindles, both because of the belt $b^6$ and also because of the frictional contact between the overhanging flange $b^7$ and the upper surface of the power-disk B.

It will be noted that the power-disk B is made of considerably larger diameter than the diameter of the spindle-whirls $b^5$ and that the power-disk being rotated from the drum at substantially the speed which is now given to the spindles in machines heretofore built the spindles themselves may be rotated at considerably greater speed than heretofore.

The spindle-driving mechanism above described forms part of another application filed by us.

We prefer that the overlap of the flange $b^7$ upon the power-disk B should be about one-sixteenth to one-eighth of an inch.

When the power-disk is attached to the rail in the manner shown, it may be adjusted in or out from the spindles so as to be in proper relation to the spindles by means of the slot $b^8$, (shown in dotted lines in Fig. 3,) through which the screw $b^9$ passes into the bracket $c$. We prefer to support the power-disk in the manner described, as the disks when so supported may be easily attached to spinning-machines of the ordinary type.

The so-called "ring-rail" D is supported and operated in the usual manner to travel vertically, being provided with apertures $d$, through which the spindles project. In order to deliver the thread to the spindle, we provide a rotary ring, which as a whole is rotated by the pull of the thread caused by the rotation of the spindle and has attached to it an eye, which while it may have a slight motion independent of the ring for purposes to be described below is substantially fixed upon the ring, so that the ring itself serves the purpose of the traveler in the ordinary spinning-machine, and in one form of our invention the part which we term the "eye" moves only as the ring moves. We have shown in the drawings various forms of construction adapted for this purpose. Turning first to Figs. 9 and 10, there is there shown a ring E mounted on what we term a "hub" F, which hub is provided with a downwardly-projecting flange $f$, passing through the aperture $d$ in the ring-rail D. Upon the upper surface of the hub, as shown, are three cavities $f'$, each sufficiently large to receive a ball $f^2$ and keep it from moving with the ring, these balls serving as bearing-points for the ring E. The ring is provided with projecting flanges $f^3$, and in this form of our invention two lips $f^4$ are formed integral with the hub F, under which the lower flange of the ring may be hooked when setting the ring in place. A detachable lip $f^5$, capable of also engaging the lower flange of the ring, is screwed to the hub, as shown in Fig. 10, so that the ring is mounted upon three points and is held in place at three points, and hence is capable of being rotated in a horizontal plane with no appreciable lateral movement and with but little friction. This is a convenient way of reducing the friction which is incident to the starting and stopping of the ring and which in some cases tends to break the yarn. In Figs. 11 and 12 a similar structure is shown, except that in this case the hub is an annulus which is attached to the rail by screws F', and which carry the balls $f^2$, as before described. The ring in this case is held in place by three detachable lips $f^6$, each screwed to the hub by two screws $f^7$ to prevent twisting. Other means of supporting the ring and holding it in position so that it may rotate with as little friction as possible may be devised without departing from the spirit of our invention. For example, we have shown in Fig. 15 a roll $f^8$ mounted in a hub F and adapted to serve as a support for a ring E, and in Fig. 16 we have shown a lip $f^9$ of a slightly different character, it being slotted to receive the lower rim of the ring E, as indicated at $f^{10}$.

In Figs. 13 and 14 we have shown two forms of eye made permanently fast to a ring E. In Fig. 13 the eye G is provided with a long shank $g$, extending down the side of the ring and riveted thereto. In Fig. 14 one end of the eye G is riveted to the top flange of the ring. In each case one end of the eye is free in order that it may be sprung slightly open to allow the thread to pass through.

We have shown in Figs. 5 and 7 what might be termed a "skeleton ring"—that is, a ring having in all respects the essentials of the ring shown in Figs. 9 and 11, but formed of two flanges $f^3$, connected by posts $h$. The lower flange in this case may be used in the same manner to support the ring as is the flange of the rings shown in Figs. 9 and 11. A portion of the upper flange, however, is used as a runway for an eye G, the ends of which are turned under it, so as to form a spring-ring into which the thread may be easily led. The advantage of these forms of construction is that the ring is much lighter than in the other form referred to, so that as it has the same rotary motion it may be moved and stopped with greater ease. In Figs. 6 and 8, while the ring is solid, a similar result as to the eye is attained by providing a runner $h'$, of wire or the like, attached to the top of the wheel, on which runner the eye G travels. The advantage of allowing the eye a restricted movement with relation to the ring is that when the spindle starts there is a slight yield on the part of the eye while the inertia of the ring is being overcome and in a similar manner a slight yield while the momentum of the moving ring is being overcome by the spindle as it slows down in stopping. We believe that this is entirely new with us, nor is there, so far as we know, any spinning-machine of the so-called "ring-spinning" class in which there is a rotating ring with an eye having a movement restricted with relation to the movement of the ring, being for this purpose either fixedly attached thereto or so attached as to have only a limited movement with relation thereto. Under these circumstances we consider this to be, broadly speaking, our invention irrespective of the details of construction which we have shown, and when taken in connection with a spindle-rotating mechanism having a speed-multiplier between the drum and spindle we believe we have shown and described a construction of great value in the art.

It is evident that the materials of which our machines shall be made will suggest themselves to all skilled in the art and need not be specified.

While we have shown an eye attached to the ring either fixedly or in such a way that it will be allowed a restricted movement, it is of course apparent that the eye may be free to travel in the ring in the same manner as it does in the ordinary spinning-frame where the ring is stationary, as our invention relates as well to the supporting of the ring as to the connection between the ring and the eye.

What we claim as our invention is—

1. In a spinning-frame, a ring and means whereby it may be supported, comprising a hub containing ball-points held in fixed position with relation to each other, and means whereby said ring may be prevented from moving horizontally, as set forth.

2. In a spinning-frame, a ring, and means whereby it may be supported, comprising a hub containing rotary points located at equal distances apart upon said hub, and means whereby said ring may be prevented from lateral movement, as described.

3. In a spinning-frame, a rotary ring carrying an eye having a movement restricted with relation to the ring, as set forth.

4. In a spinning-frame, a ring comprising two flanges and posts connecting said flanges, as described.

5. In a spinning-frame, a rotary ring comprising two flanges suitably connected, and an eye having a restricted movement with relation thereto.

6. In a spinning-frame, a rotary ring comprising two flanges and posts connecting said flanges, and an eye encircling one of said flanges and running thereon between two of said posts, as described.

7. In a spinning-frame, a rotary ring and means for supporting it comprising a plurality of ball-points arranged as described.

8. In a spinning-frame, a rotary ring and means for preventing its lateral movement comprising a plurality of non-resilient lips located about the periphery of the ring as described.

9. In a spinning-frame, a rotary ring and a plurality of lips adapted to prevent its lateral movement, and means for supporting said ring comprising a plurality of points whereby the friction incident upon starting and stopping the ring will be minimized, as set forth.

10. In a spinning-frame, a rotary ring, and means for supporting it comprising a plurality of points arranged as described, whereby the friction incident upon starting and stopping the ring will be minimized, as set forth.

JOHN J. BUCKLEY.
THOMAS P. McGINN.
JOHN A. ROGAN.

In presence of—
GEORGE O. G. COALE,
M. E. FLAHERTY.